(12) United States Patent
Parker

(10) Patent No.: US 9,661,003 B2
(45) Date of Patent: May 23, 2017

(54) SYSTEM AND METHOD FOR FORENSIC CYBER ADVERSARY PROFILING, ATTRIBUTION AND ATTACK IDENTIFICATION

(71) Applicant: Thomas W. Parker, Washington, DC (US)

(72) Inventor: Thomas W. Parker, Washington, DC (US)

( * ) Notice: Subject to any disclaimer, the term of this patent is extended or adjusted under 35 U.S.C. 154(b) by 0 days.

(21) Appl. No.: 13/893,247

(22) Filed: May 13, 2013

(65) Prior Publication Data

US 2013/0312092 A1    Nov. 21, 2013

Related U.S. Application Data

(60) Provisional application No. 61/645,673, filed on May 11, 2012.

(51) Int. Cl.
*H04L 29/06*    (2006.01)

(52) U.S. Cl.
CPC ................ *H04L 63/1408* (2013.01)

(58) Field of Classification Search
CPC . H04L 63/14; H04L 63/1408; H04L 63/1425; H04L 63/1433; G06F 21/55; G06F 21/56
USPC ......................................................... 726/22
See application file for complete search history.

(56) References Cited

U.S. PATENT DOCUMENTS

| | | | |
|---|---|---|---|
| 7,543,056 B2 | 6/2009 | McClure et al. | |
| 8,201,257 B1 | 6/2012 | Andres et al. | |
| 8,214,497 B2 | 7/2012 | Alperovitch et al. | |
| 2001/0052014 A1* | 12/2001 | Sheymov | H04L 63/1408 709/225 |
| 2011/0010560 A1* | 1/2011 | Etchegoyen | 713/189 |
| 2012/0110667 A1* | 5/2012 | Zubrilin et al. | 726/24 |
| 2013/0247205 A1* | 9/2013 | Schrecker et al. | 726/25 |

OTHER PUBLICATIONS

Thomas Parker, "Finger Pointing for Fun, Profit and War?",presentation at Black Hat USA 2010 Conference, Caesars Palace, Las Vegas, NV, Jul. 28-29, 2010.

* cited by examiner

*Primary Examiner* — Yogesh Paliwal
(74) *Attorney, Agent, or Firm* — Rene A. Vazquez, Esq.

(57) ABSTRACT

A system and method is provided for identifying and analyzing cyber-attacks and profiling adversaries responsible for such attacks. The system and method allows for the quantitative measurement of adversary attack behavior. The system and method is able to extract quantitative data from raw attack data and compare the quantitative data to a database of quantifiable metrics associated with known adversaries. This allows for the possible linking of a cyber-attack to a known adversary or known adversary behavior.

18 Claims, 8 Drawing Sheets

```
1: If (1 is  not true) {
2:     If (1 is not true) and (2 is not false) {
3:          StartAttack (1,2) ;
4:     }
5: }
6:
7:    function StartAttack (1,2) {
8:    If (1 is not true and 2 is true) {
9:        call OS.SomethingBad () ;
10:   print "Attack Started" ;
11:   return () ;
12: }
```

FIG. 2A

```
1: If (ConnectedToInternet () is 1)  {
2:    File = DownLoadUpdate () ;
3:    StandardAPI.DecryptFile  (File);
4:    Kernel = StandardAPI.OpenKernelMemory();
5:   Success = InjectToKernel (Kernel, Update);
6:   If(Success is 1)  {
7:       StandardAPI.KernelExitThread();
8:   }
```

FIG. 2B

| COLUMN NAME | VALUE | TYPE | WEIGHT |
|---|---|---|---|
| Unique_id | 0012 | INFORMATIONAL | N/A |
| Code_name | APT-12 | INFORMATIONAL | N/A |
| TYPE | 1 (STATE SPONSORED) | INFORMATIONAL | N/A |
| SOPHISTICATION | 5 | CORRELATION POINT | 6 |
| Assoc_IPs | → RELATIONAL LINK: ADDRESS TABLE | CORRELATION POINT | 8 |
| Assoc_Malware | → RELATIONAL LINK: MALWARE TABLE | CORRELATION POINT | 6 |
| Industry_Focus | → RELATIONAL LINK: HISTORICAL FOCUS TABLE | CORRELATION POINT | 5 |
| Assoc_Techniques | → RELATIONAL LINK: ATTACK TECHNIQUE | CORRELATION POINT | 6 |

FIG. 4B

SYSTEM AND METHOD FOR FORENSIC CYBER ADVERSARY PROFILING, ATTRIBUTION AND ATTACK IDENTIFICATION

This application claims priority to U.S. Provisional Application Ser. No. 61/645,673 filed May 11, 2012, whose entire disclosure is incorporated herein by reference.

BACKGROUND OF THE INVENTION

1. Field of the Invention

The present invention relates to cyber attacks and, more specifically, to cyber attack identification and to the profiling of cyber-attackers or adversaries.

2. Background of the Related Art

Cyber-attacks are one of the most challenging threats which face the success of modern businesses, government institutions and private citizens. The high volume of cyber-attacks which are experienced by most entities that are engaged in the use of information technology result in unique challenges when trying to more fully understand the nature of the cyber-attacks, quickly identify attacks of specific concern, and develop effective counter-measures for the broad-range of cyber-attack methods that are at the disposal of the cyber adversary.

While history has shown that video surveillance footage, fingerprints, ballistic forensics, DNA and other investigative methods have proven to be an effective means for identifying those responsible for events in the physical world, the cyber domain is without an effective means of effectively identifying or developing leads with regards to those responsible for an attack. In order to bridge this gap, many organizations have become focused on the particular technologies that have been developed to carry out cyber-attacks, so that the specific actions or impacts of the applied technology can be analyzed. This approach does not provide the means to consider the adversary behind the attack. While this approach is often helpful in the short term, it is analogous to a gun-shot victim receiving emergency care for the immediate wound, without performing forensics on the bullet and attempting to identify the weapon from which the bullet may have been shot from.

SUMMARY OF THE INVENTION

An object of the invention is to solve at least the above problems and/or disadvantages and to provide at least the advantages described hereinafter.

Therefore, an object of the present invention is to provide a system and method for analyzing cyber-attacks.

Another object of the present invention is to provide a system and method for profiling adversaries responsible for cyber-attacks.

Another object of the present invention is to provide a system and method for the quantitative measurement of adversary behavior.

Another object of the present invention is to provide a system and method for extracting quantitative data from raw cyber-attack data.

Another object of the present invention is to provide a system and method for determining if a cyber-attack is associated with a known adversary and/or known adversary behavior.

Another object of the present invention is to provide a system and method for creating a database of quantifiable metrics associated with known adversaries and adversary behavior.

To achieve at least the above objects, in whole or in part, there is provided a method of analyzing a cyber-attack, comprising collecting attack data, wherein the attack data comprises data associated with a cyber-attack, extracting quantitative data from the attack data, wherein the extracted quantitative data ("EQD") comprises quantifiable metrics associated with a cyber-attack, comparing the EQD with a database of existing adversary and attack data ("AAD"), wherein the AAD comprises quantifiable metrics of known adversaries and adversary behavior, and determining if the EQD is associated with a known adversary and/or known adversary behavior based on the comparison step.

To achieve at least the above objects, in whole or in part, there is also provided a system for analyzing a cyber-attack, comprising a processor, processor memory, and a cyber profiling engine comprising a set of computer readable instructions stored in processor memory that are executable by the processor to: receive attack data, wherein the attack data comprises data associated with a cyber-attack, extract quantitative data from the attack data, wherein the extracted quantitative data ("EQD") comprises quantifiable metrics associated with a cyber-attack, compare the EQD with a database of existing adversary and attack data ("AAD"), wherein the AAD comprises quantifiable metrics of known adversaries and known adversary behavior, and determine if the EQD is associated with a known adversary and/or known adversary behavior based on the comparison step.

To achieve at least the above objects, in whole or in part, there is also provided a system for analyzing a cyber-attack, comprising at least one attack and adversary intelligence system ("AAIS"), wherein each AAIS comprises an AAIS processor and AAIS memory, at least one data aggregator associated with each AAIS, wherein each data aggregator comprises a data aggregator processor and data aggregator memory, a respective analysis engine associated with each data aggregator comprising a set of computer readable instructions stored in data aggregator memory that are executable by the data aggregator processor to: receive attack data, wherein the attack data comprises data associated with a cyber-attack, extract quantitative data from the attack data, wherein the extracted quantitative data ("EQD") comprises quantifiable metrics associated with a cyber-attack, a respective database associated with each AAIS comprising a set of computer readable instructions stored in AAIS memory that are executable by the AAIS processor to store existing adversary and attack data ("AAD"), wherein the AAD comprises quantifiable metrics of known adversaries and known adversary behavior, and a respective intelligence engine associated with each AAIS comprising a set of computer readable instructions stored in AAIS memory that are executable by the AAIS processor to: receive the EQD, compare the EQD with the AAD, and determine if the EQD is associated with a known adversary and/or known adversary behavior based on the comparison step.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 2A and 2B show hypothetical samples of attack related pseudo-code;

FIG. 4B is a table showing a simplified adversary data profile for a theoretical adversary, in accordance with one preferred embodiment of the present invention;

DETAILED DESCRIPTION OF PREFERRED EMBODIMENTS

The present invention provides an approach to analyzing cyber-attacks for the purpose of developing a profile of the adversary responsible for the attack. This is a highly specialized area that requires purpose-built analysis tools and methods. The present invention provides a system and method for profiling the behaviors of a cyber-attacker or adversary that consists of an analysis mechanism, coupled with a database of previously observed or theoretical data regarding adversary behaviors, such as cyber-attack methods (e.g., field craft). The terms "adversary", "attacker" and "cyber-attacker" are used interchangeably herein, and refer to a party or entity that can initiate or has initiated a cyber attack that targets information networks and/or computer networks.

The present invention overcomes some of the challenges associated with the handling of cyber-attacks and provides methods, systems and services which empower end-users to have previously unavailable insight into the cyber adversaries with which they are faced, thereby enabling end-users to quickly identify attacks against information technology assets.

The present invention allows for the quantitative measurement of adversary attack behavior in order to establish or infer a range of projections regarding the adversary, such as, for example: (1) their level of sophistication; (2) the monetary, technological and/or other resources expended during or in preparation for the attack; and (3) the intent or end-goal of the adversary. This data may be utilized for the broad characterization of the individual or groups responsible for cyber-attacks, which may ultimately lead to complete attribution and identification of the actor(s) responsible.

The data may additionally be leveraged for expeditious identification of attacks of interest in settings where large amounts of attack data exists and which require additional processing or analysis. This can be implemented with an autonomous software platform, designed for both real-time and non-real-time (historical) analysis of attack data, or as a tool-set that can be leveraged in support of manual cyber-attack analysis methods.

Figure 1:
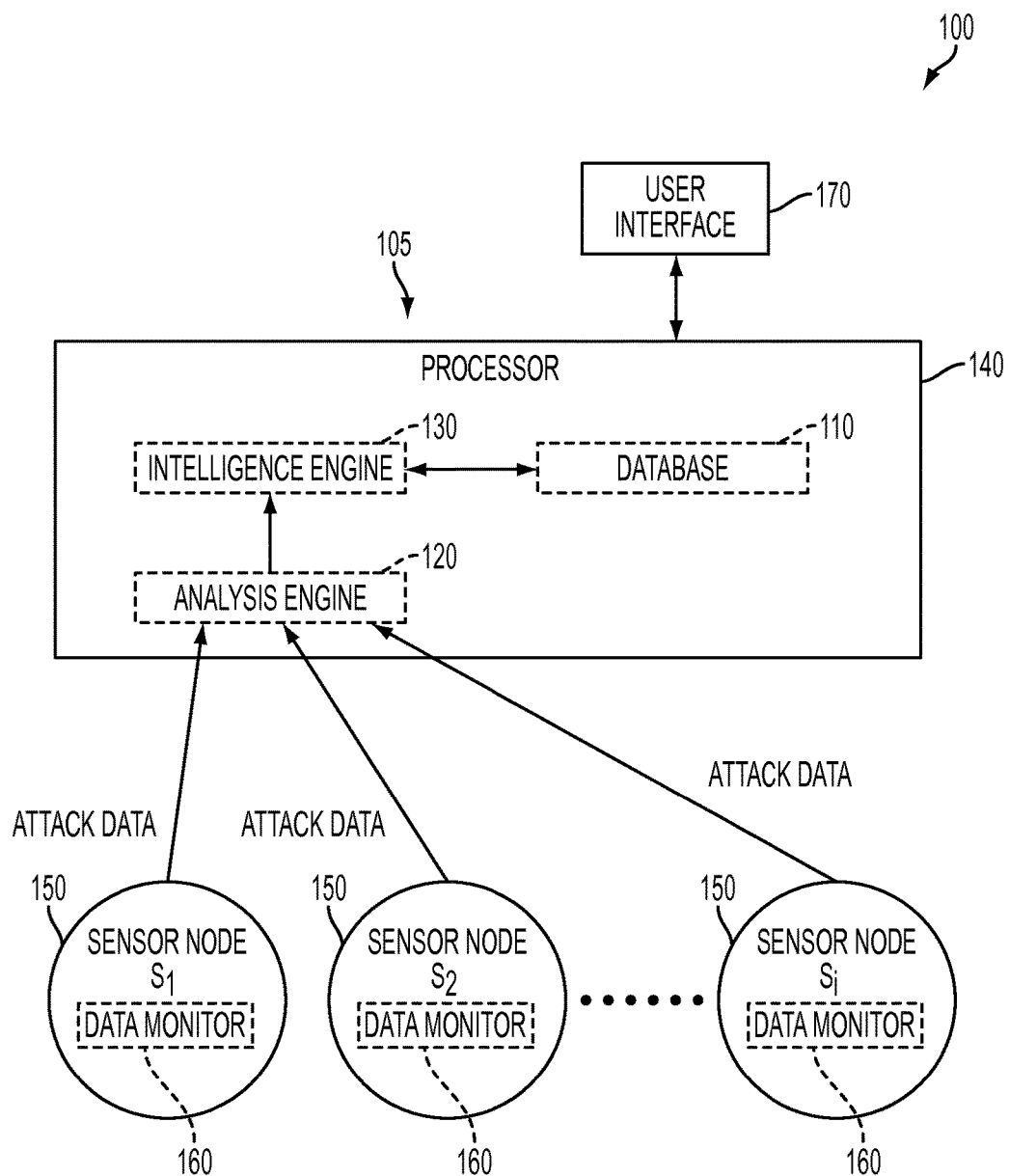
FIG. 1 is a block diagram that illustrates the major components of a cyber profiling system, in accordance with one preferred embodiment of the present invention.

FIG. 1 is a block diagram that illustrates the major components of a cyber profiling system 100, in accordance with one preferred embodiment of the present invention. The system 100 includes a cyber profiling engine 105 that comprises a database 110, an analysis engine 120 and an intelligence engine 130, all of which preferably run on at least one processor 140.

The database 110, analysis engine 120 and intelligence engine 130 are preferably each implemented with one or more programs or applications run by the processor 140 or by multiple processors. The programs or applications that implement the database 110, analysis engine 120 and intelligence engine 130 are respective sets of computer readable instructions that are stored in memory (not shown) that are accessed by the processor 140.

The processor 140 can be implemented with any type of processing device, such as a general purpose desktop computer, general purpose laptop computer, a special purpose computer, a distributed computing platform located in a "cloud", a server, a tablet computer, a smartphone, a programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of running the software used to implement the analysis engine 120, the intelligence engine 130 and the database can be used as the processor(s) 140.

The database 110 preferably includes profiles of known adversaries and/or profiles of previously analyzed cyber-attacks. The profiles preferably contain previously observed and/or theoretical quantitative data relating to adversary characteristics and behavior, as well as previously observed and/or theoretical quantitative data regarding the types of cyber attack mechanisms used. The quantifiable data preferably define quantifiable metrics associated with adversaries and/or cyber attacks. These profiles will hereinafter be referred to as attack and adversary data ("AAD"). The AAD preferably include, but are not limited, the following categories of quantifiable metrics ("forensic categories"):

(1) Adversary Sophistication Level: the sophistication of the parties responsible for a cyber-attack may be ascertained through the analysis of attack data in order to provide insight into the type of adversary that a cyber-attack victim is faced with. As a case in point, sophisticated adversaries are typically highly resourced and will spend a significantly higher level of human and financial resources on cyber-attacks. The high sophistication of a given attack may therefore provide insights into the resources expended, and possibly the capabilities and identity of those responsible for the attack. Measuring the sophistication of an attack may extend to the technologies or tools utilized by an attacker (such as attack software), the procedures utilized during the attack (such as reconnaissance performed) and the particular techniques utilized in the implementation and use of particular tools or procedures.

(2) Attack Objectives: methods for identifying observable objectives of a cyber-attack are significant as they often indicate the intent of the adversary. Generally speaking, discreet subsets of adversaries will have differing intents. For example, the intent of organized crime groups engaged in cyber-attacks is typically financially motivated. Therefore, if an attack can be quantitatively identified as being intended to target financial data, such a measure may be utilized to conclude the nature of the adversary responsible, or at least narrow attribution to a subset of known adversaries.

(3) Attack Targeting: methods for quantitatively observing the level of cyber-attack targeting will often provide valuable data regarding the nature of the cyber-attack and adversary. Many cyber-attacks are launched against broad sets of victims, while others are highly surgical in nature and target small groups of individuals or organizations in key positions consistent with the objectives of the adversary. Observation of attack targeting therefore provides key data that can augment other data regarding the objectives of a cyber-attack.

(4) Technological Specifics: methods for the analysis of the technologies woven into the techniques, tools and procedures of an adversary can provide significantly valuable data, which can be utilized to further profile the adversary. As a general method, the properties of attack software and other attack technologies may be quantitatively evaluated as to their purpose, implementation and origins (such as the identification of innovation on the part of the adversary).

In addition to AAD, the database 110 may also store asset information relating to the properties of information technology assets which may be subject to cyber-attack. This data may include the type of asset (such as operating system data), the function of the asset (such as who uses the asset, or what its significance is—e.g. the laptop of a company CEO, or a server relating to the finance department).

The AAD stored in the database 110 preferably includes data regarding adversary groups, particular adversary profiles and knowledge of prior activities of a given adversary or group of adversaries. As will be explained in more detail below, when data from a new cyber-attack is available, raw data derived from the cyber-attack is preferably analyzed using methods designed to extract quantitative data, preferably quantitative data falling into one or more of the forensic categories. The extracted quantitative data ("EQD") is then compared with the AAD stored in the database 110 in order to identify correlations to previously observed cyber-attack activities. This method, in effect, attempts to establish a "cyber-attack fingerprint" or profile that is compared with known "fingerprints" or profiles stored in the database 110. Even without a cyber-attack profile match (or an attempt to identify such a match), the EQD obtained from the analysis methods could be utilized for actionable means.

The Analysis Engine

The analysis engine 120 is responsible for analyzing raw data, collected from sensors and/or other data aggregation sources, such as Security Event Manager (SEM) and Security Information and Event Management (SIEM) technologies. This raw data collected for analysis potentially relates to a cyber-attack (hereinafter referred to as "attack data") and is analyzed in order to extract quantitative data (EQD) from the attack data, preferably EQD falling into one or more of the forensic categories. Attack data collected for analysis may vary largely based on the nature of the technology environment of deployment. However, the attack data may typically include, but is not limited to, log data from firewalls, intrusion detection and/or prevention system logs, net-flow data from network artifacts, such as routers and switches, binary programs, file system, registry, network connectivity data and any other data generated by host-based agents, operating system logs, anti-virus logs, application white-listing technologies, malware sandbox technologies and static analysis tools. Much like the nervous system, the collective purpose of gathering data from a multitude of sources is to allow the intelligence engine 130 to reach conclusions as to correlations between data collected and analyzed, and the AAD stored in database 110, and therefore the potential presence of an adversary within and therefore an attack against the respective technology environment.

The attack data is collected and transmitted to the analysis engine 120 by sensor nodes 150 (individually labeled as $S_1$, $S_2 \ldots S_i$). Each sensor node 150 is preferably a processing device on which a respective data monitor 160 runs. The data monitor 160 is preferably implemented with one or more programs or applications run by the sensor node 150. The programs or applications that implement the data monitor are sets of computer readable instructions that are stored in memory (not shown) that are accessed by the sensor node 140.

The database 110, intelligence engine 130, analysis engine 120 and sensor nodes 150 are preferably connected to one or more networks (hereinafter referred to as "network") through which they can communicate with each other. The data monitor 160 captures and collects attack data (e.g., metadata) and the sensor node 150 transmits the attack data via the network.

Each sensor node 150 can be implemented with any type of processing device, such as a general purpose desktop computer, general purpose laptop computer, a special purpose computer, a server, a tablet computer, a smartphone, a firewall, a router, a switch, a programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of running the software used to implement the data monitor 160 can be used as the processor 140.

The network to which the database 110, intelligence engine 130, analysis engine 120 and sensor nodes 150 are connected can be a wired or wireless network, and may include or interface to any one or more of for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, an ATM (Asynchronous Transfer Mode) connection, an FDDI (Fiber Distributed Data Interface) or CDDI (Copper Distributed Data Interface) connection.

The network may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link, such as a cellular phone channel, a GPS (Global Positioning System) link, CDPD (Cellular Digital Packet Data), a Blackberry® device, a Bluetooth radio link, an IEEE standards-based radio frequency link (WiFi), or any other type of radio frequency link. The network may yet further be, include or interface to any one or more of an RS-232 serial connection, an IEEE-1394

(Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The sensor nodes 150 may send attack data to the analysis engine 120 based on a pre-defined rule set and/or in response to on-demand requests by a user via an optional user interface 170. The user interface 170 can be any type of user interface known in the art, such as a graphical user interface, a web-based user interface and the like. The user interface can be used to request attack data from one or more sensor nodes 150, as well as to manually enter data into the database 110.

As discussed above, the analysis engine 120 receives and analyzes attack data from one or more sensor nodes 150 and extracts quantitative data (EQD) from the attack data, preferably EQD falling into one or more of the forensic categories. The EQD is preferably quantifiable metrics associated with a cyber-attack and/or an adversary associated with a cyber-attack. The analysis techniques used by the analysis engine are preferably designed to extract quantitative data from the attack data that fall into one or more of the forensic categories. For example, the analysis techniques can include, but are not limited to:

analysis of attack codes in order to determine the sophistication of the code and possibly its author or authors, resulting in a quantitative data representation of sophistication and potentially attribution;

analysis of code functionality for the purpose of creating quantitative representations of analyzed code functionality (or purpose), or sequences of functionality (often referred to as code blocks) within the analyzed subject;

analysis of attack code and other attack meta-data in order to determine attack intent, resulting in a quantitative data representation of intent; and analysis of potential attack codes to determine its purpose. This includes the use of function call and instruction-level analysis to identify specific functionality implemented by the code being analyzed, resulting in a quantitative data representation of code purpose.

Fundamental analysis techniques utilized by the analysis engine 120 in order to obtain EQD for use by the intelligence engine 130, and therefore to establish linage to potential adversaries responsible and the intent of an attack, may include, but are not limited to:

'Static', 'runtime' binary analysis techniques of attack related computer code captured by the data monitor 160 or other technologies capable of such collection, in order to extrapolate quantitative data. Code analyzed may extend to, but is not limited to, any attack related software placed on compromised systems during an attack, which facilitate attacker activities, such as persistence components, exploit codes permitting lateral movement in a compromised technology environment, software utilized for the purpose of keyboard input capture, packet sniffing and other network-based password capture tools. Analysis techniques may include, but are not limited, to static and dynamic function call and perimeter mapping, program process memory analysis, both kernel level and user space oriented analysis techniques in order to subvert anti-debugging methods implemented by attack software, statistical analysis of function calls and specific instructions contained within a computer program under analysis. These techniques may be utilized to obtain data points including, but not limited to:

Command and control data such as internet protocol (IP) addresses, hostnames, domains and other specific configurations relating to the way in which the attack software receives commands from the adversary and/or that which facilitates the transmission of data from compromised systems. This may additionally include the programmatic structure of network communications protocols implemented by the attack software, which may be entirely preprimary, based on common communications protocols (such as Hyper Text Transfer Protocol/HTTP), or modifications of common communications protocols.

Creation of checksums associated with files, computer programs, and sub-sections of computer programs linked to an attack, including but not limited to MD4, MD5, SHA1, SHA256 based hash algorithms.

Specific structural observations regarding the computer program, including, but not limited to, the naming of 'sections' such as .code, .text, .data; program entry point addresses, computer program import and export tables; binary program compression, packing and encryption techniques utilized.

Extraction of development tool 'markings' which may have been created during the authorship of attack software including, but not limited to, compilation time stamps, compiler metadata, debug symbols references (such as Microsoft Program Database or PDB file references).

Methods utilized by the computer program to persist, on a computer system, such as, but not limited to, specific programmatic methods utilized for process memory injection, manipulation of the system registry, writing to files, modification of operating system structures.

Observation of and statistical analysis of programmatic specifics that may allow the program to perform more or less efficiently than otherwise, or may be utilized to infer author sophistication and/or sophistication of the environment (such as within a business or governmental body) under which a program was authored. These may include, but are not limited to, the observation nested conditional statements, unclosed file handles, duplicate or unutilized code segments or functionality, memory leaks, unclosed or duplicate network sockets, memory corruption issues resulting from the allocation and/or de-allocation of memory by the program, unutilized variables, variable initialization and type setting issues, integer variable signing and sizing issues, variable scoping and visibility issues, variable termination issues (such as incorrectly terminated string variables), shared memory permissions flaws and programmatic loop control/management flaws.

Structural observations regarding programmatic methods for achieving specific functionality within the program, such as writing to or reading from files, writing to system registries, reading from or writing to process memory, capturing of network traffic, capturing of network keystrokes, capturing of data from, or sending instructions to hardware attached to the attacked system, collection of data from the system and the transmission or receipt of network communications.

Network connectivity data from sensor nodes 150, such as currently or previously established network connections including, but not limited to, the source, destination, source port, destination port, connection time, connection duration and protocol.

"Digital Hydroids" or sensor performance data (such as CPU and memory usage) which may suggest host-level duress or otherwise abnormal behaviors associated with an attack, as disclosed in co-pending and commonly assigned U.S. patent application Ser. No. 13/829,613 filed on Mar. 14, 2013.

Intrusion detection system and other security technology event data (collectively referred to "security event data") from sensor nodes 150 including, but not limited to, firewalls, IDS systems, anti-virus and related systems. The usefulness of data from such sensor sources will vary based on the nature of the source. The analysis engine 120 preferably analyzes the potential usefulness and credibility of the security event data based on an internal database (hereinafter referred to as "SED database"), which may be managed by a user via the user interface 170 and may be dynamically updated based on the historical credibility of the sensor node 150 providing the security event data. Basic data extracted from this category of sensor by the analysis engine 120 may include, but is not limited to, event time-stamps, internet protocol (IP) addresses, protocol names and port numbers, network traffic samples and binary program metadata for analysis, as described above. Given that the security product market is rapidly changing, maintenance of the SED database utilized by the analysis engine 120 is important in understanding the potential use of security event data generated by such sensors. This SED database may be optionally synchronized with other SED databases in other analysis engines, as will be explained below in connection with FIG. 7.

An example of an analysis technique for determining the sophistication of code utilized by an attacker during a cyber attack will now be described. Much like a spoken or written language, where the relative sophistication of the user may be established through their use of correct (or incorrect) grammar, pronunciation, punctuation and spoken cadency, the sophistication of the computer programmer may also be estimated through observable artifacts in their work effort. Computer programs are typically highly structured and can be analyzed in either source, binary or intermediary forms in order to identify signs of sophistication, or a lack thereof, on the part of the author. In addition, stylistic specifics of an individual computer programmer enables analysis which may effectively determine whether a given computer program has been contributed to by one or more individuals.

This approach may be further extended to identify whether a program contains prior art which has been copied by the author from existing programs. The quantitative identification of both the sophistication and the genesis of a computer program used in an attack can be very valuable in establishing a profile of the adversary responsible.

FIG. 2A shows hypothetical code for providing a demonstration of how analysis techniques for determination of code and/or author sophistication may be applied. In the example shown in FIG. 2, one can observe that in lines 1 and 2 what is known as a nested loop statement exists which may indicate that a novice programmer was responsible for the authorship of this particular segment of code. This data point can therefore be utilized in consideration of the sophistication of the adversary. Other programmatic artifacts which could be similarly utilized when considering a given computer program may include, but are not limited to: (1) heavily nested conditional statements; (2) unclosed file handles; (3) memory leaks; (4) unutilized but initialized variables; and (4) code-reuse. In the example of FIG. 2, in lines 7-12 one can observe a function called by our suspected novice programmer for starting the attack.

Cross referencing this particular data point with previously known information on a given adversary may indicate that this code has been borrowed from another attacker, who may be previously known. Should this be the case, this immediately indicates that there is a relationship between the author of the code under analysis, and a known adversary which exists within the database 110. Regardless of any prior correlation to known adversaries, analysis of this function indicates an alternative structuring of conditional statements by the author, demonstrating a higher level of sophistication in programming. Thus, one can potentially conclude that these twelve lines of code were, at the very least, written by two authors with differing skill levels. This quantitative data can now be stored in the database 110 for later use.

A large number of new computer programs (including "malware") associated with cyber-attacks are found on the internet each day. FIG. 2B shows hypothetical samples of attack related pseudo-code for providing a demonstration of how analysis techniques for determination of code functionality may be applied. In the code shown in FIG. 2B, an unknown program is placed amongst thousands of other unknown samples and is subjected to automated analysis. The analysis engine 120 is preferably adapted to identify specific program behaviors that may indicate the development of a new attack technology by a currently unknown adversary.

In the eight lines of code shown in FIG. 2B, a never-before-seen technique has been implemented by a hypothetical attacker which allows the attack code to update itself and inject the program into the kernel of the compromised system. Although no fingerprint (AAD) exists for this program in the database 110, the analysis engine 120 is preferably adapted to identify the specific use of sequences of known programming functions that are often associated with malicious software activity. While techniques currently exist for identifying the results of malicious activity, the analysis engine 120 is preferably adapted to identify code functionality and programmatic implementation, rather than the effect of such functionality and implementation.

In the FIG. 2B example, the analysis engine 120 identifies the hypothetical pseudo-code functions DecryptFile, OpenKernelMemory and KernelExitThread (in this example, in that order) and singles out this particular program in order to perform further automated analysis or manual analysis by a user, which could result in proactive-defensive actions being taken by a user (e.g., preventing the program from being run on computer systems which the user is charged with defending). The results of this analysis, including the identification of a new technique, would be stored in the database 110.

The analysis engine 120 can be easily reprogrammed by a user (e.g., an administrator or other user), such that the way in which attack data is processed, analyzed and derived into EQD can be modified. This reprogramming can be done, for example, via the user interface 170 or via communications between the intelligence engine 130 and the analysis engine 120. This may include the introduction of new analysis engine 120 behaviors and/or the modification of existing analysis engine 120 behaviors. Analysis engine 120 may additionally respond to requests from the intelligence engine 130, or a user via the user interface 170, to transmit the raw, unprocessed attack data received from sensor nodes 150.

The Intelligence Engine

The analysis engine 120 sends the EQD to the intelligence engine 130 for further analysis and storage in the database 110. While the intelligence engine 130 may optionally perform many of the functions of the analysis engine 120, these functions are preferably performed by the analysis engine 120 for the purpose of scalability and efficiency. Specifically, the intelligence engine 130 preferably compares the EQD to AAD stored in the database 110 in order to establish a possible correlation between the EQD and known adversaries.

The intelligence engine 130 may be optionally adapted to provide an alert when a positive correlation between the EQD derived from that attack data and known adversaries. This alert is preferably triggered when the correlation achieves a predetermined probability threshold (e.g., the intelligence engine 130 calculates that there is a 95% probability that a known adversary is responsible for the attack data generated by the particular sensor node 150). The intelligence engine 130 can use any data correlation techniques known in the art for comparing the EQD to the AAD in the database 110 and determining a match probability. This alert can be either automatically sent to the owner of the sensor node 150 that provided the attack data that yielded the positive correlation, or it can be sent to an analyst who can then alert the owner of the sensor node 150.

If a match is determined, based on a predetermined probability threshold, the intelligence engine preferably updates the profile (AAD) of the known adversary in the database 110 with the EQD derived from the attack data provided by the sensor node 150. If the intelligence engine 110 does not find a match based on the AAD in the database 110, then the intelligence engine 130 preferably established a new profile for an unknown adversary in the database 110 using the EQD from the unknown adversary.

System Operation

Figure 3:
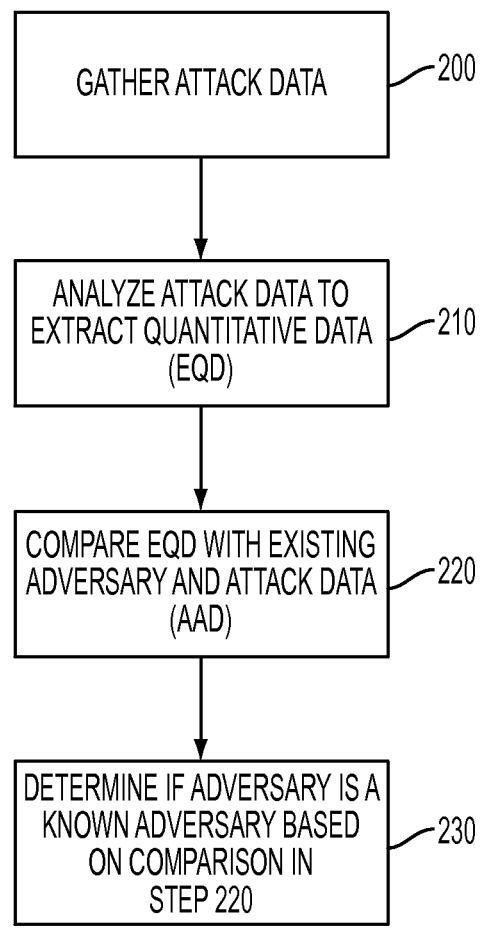
FIG. 3 is a flowchart illustrating steps in the operation of the cyber profiling system, in accordance with one preferred embodiment of the present invention.

FIG. 3 is a flowchart illustrating steps in the operation of the cyber profiling system 100, in accordance with one preferred embodiment of the present invention. The process starts at step 200, where attack data is gathered, preferably by one or more sensor nodes 150. Then, at step 210, that attack data is analyzed to extract quantitative data (EQD). This step is preferably performed by the analysis engine 120. The EQD preferably falls into one or more of the forensic categories discussed above.

The process then proceeds to step 220, where EQD is compared to AAD that is stored in the database 110. Then, at step 230, the system determines if the adversary associated with the attack data is a known adversary based on the comparison done at step 220.

As used herein, the phrases "known adversary" and "unknown adversary" do not necessarily refer to the exact identity of an adversary. An adversary may be considered "known" if multiple cyber-attacks can be traced to a common adversary based on the AAD in the database 110 and the analysis performed by the analysis engine 120 and the intelligence engine 130. That common adversary responsible for multiple cyber-attacks would be considered "known", even though there may not be knowledge of the adversary's actual identity.

Figure 4A:
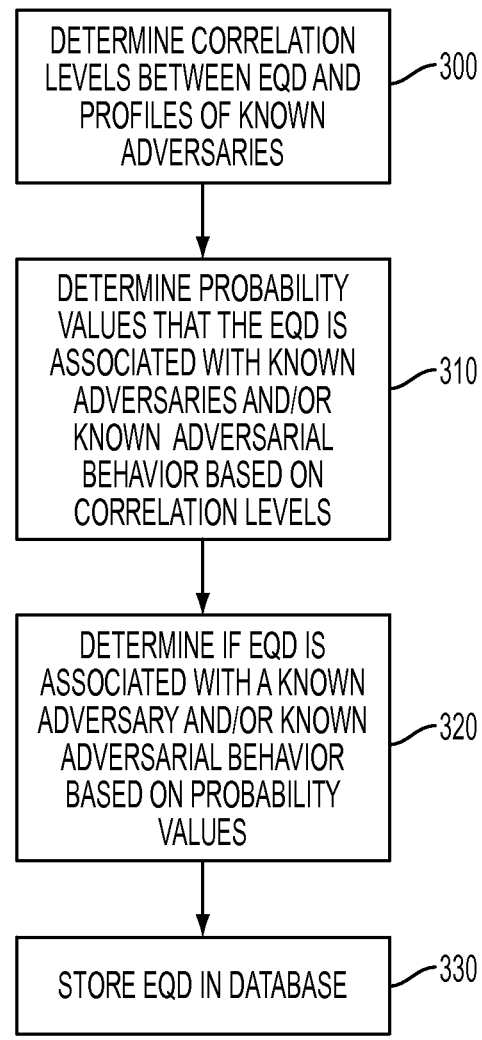
FIG. 4A is a flowchart illustrating one example of how steps 220 and 230 of FIG. 3 can be implemented, in accordance with one preferred embodiment of the present invention.

FIG. 4A is a flowchart illustrating one example of how steps 220 and 230 can be implemented, in accordance with one preferred embodiment of the present invention. The process starts at step 300, where correlation levels between EQD and profiles of known adversaries in the AAD are determined. This is accomplished by using any correlation techniques and/or data correlation models known in the art. However, the data correlation model is preferably driven via a predetermined understanding of the weight that each data point within a given adversary data-set may carry. For example, much like a fingerprint correlation, a total of X data points may be available for a given adversary, where any Y points of correlation may be required in order to make a positive correlation, where Y may be a threshold configured by a user via the user interface 170. However, in this model, certain data points may carry more weight than others.

For example, FIG. 4B is a table showing a simplified adversary data profile for a theoretical adversary X. Note that several data fields relate to one or more data rows which, as such, are represented in external database tables. In the table, the column entries are defined as follows:

"Unique_id": unique numeric identifier, providing a programmatic key with which a particular data row set may be referenced.

"Code_name": an English language nom de guerre, which may be utilized to reference this adversary during technical conversations.

"Type": a broad category for this particular adversary, where an integer value of 1 represents a state sponsored adversary of record.

"Sophistication": a relative sophistication level based upon past activities attributed to this particular adversary of record.

"Assoc_IPs": a relational database link to a table containing Internet Protocol addresses, known to be associated with the adversary of record.

"Assoc_Malware": a relational database link to a table containing metadata relating to attack code, known to be associated with the adversary of record.

"Industry_Focus": a relational database link to a table containing data relating to businesses and/or individuals and/or industries previously targeted by the adversary of record.

"Assoc_Techniques": a relational database link to a table containing a quantitative representation of technical attack methods, or trade craft known to associated with the adversary of record.

Returning to FIG. 4A, at step 310 probability values that the EQD is associated with known adversaries and/or known adversarial behavior are determined based on the correlation levels between the EQD and the various profiles of known adversaries in the AAD. These probability values can be determined using any technique known in the art, but are preferable determined using aggregates developed based on the weight carried by points of correlation.

At step 320, it is determined whether the EQD is associated with a known adversary and/or known adversarial behavior based on the probability values determined at step 310. This determination can be made, for example, based on the highest probability value regardless of what that probability value is (e.g., link the EQD to the known adversary associated with the highest probability value regardless of what that probability value is).

Figure 5:
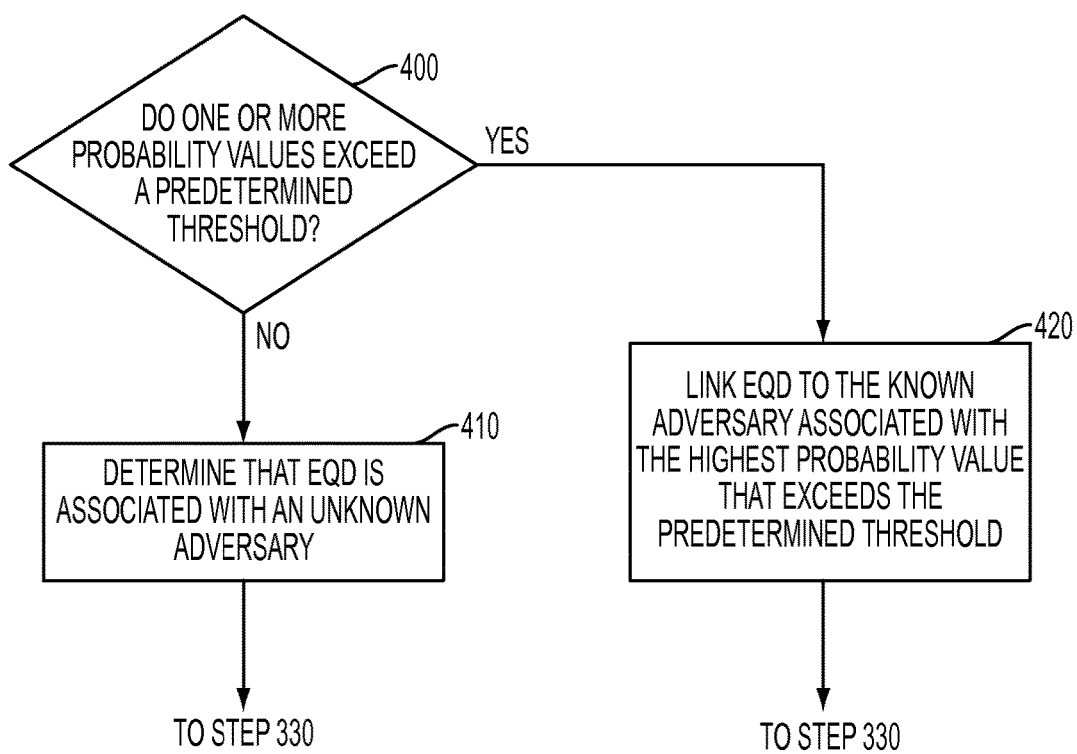
FIG. 5 is a flowchart illustrating one example of how step 320 of FIG. 3 can be implemented, in accordance with one preferred embodiment of the present invention.

Alternatively, the determination can be subject to the probability values exceeding a predetermined threshold. This is illustrated in FIG. 5, which is a flowchart illustrating one example of how step 320 in FIG. 4A can be implemented, in accordance with one preferred embodiment of the present invention. The process starts at step 400, where it is determined if one or more probability values exceed a predetermined threshold. If not, then the process proceeds to step 410, where it is determined that the EQD is associated with an unknown adversary. The process the jumps to step 330 (FIG. 4A), where the EQD is stored in the database 110. The predetermined probability threshold can be any value, but it is preferably at least 90%. This probability threshold can be fine-tuned by an end-user, including through the user interface.

If one or more probability values do exceed the predetermined threshold, then the process jumps to step 420, where the EQD is linked to the known adversary associated with the highest probability value that exceeds the predetermined threshold. The process the jumps to step 330 (FIG. 4A), where the EQD is stored in the database 110.

The intelligence engine 130 is preferably adapted so that the linking of the EQD to a known adversary triggers an alert. The alert could further trigger automated actions on the part of the intelligence engine. For example, the alert could trigger automatic notifications to the sensor node 150 from which the attack data originated. Additional examples of automated actions that can be triggered by an alert include, but are not limited to, the transmission of autonomous instructions to computer systems, such as firewalls, routers, switches or security devices, which may have the ability to intervene in or otherwise limit the impact of a given attack. Similar actions may additionally be taken in order to capture additional data, such as instructing connected sensor nodes 150 to gather a specific type of data based on the composition of the sensor node 150 and the nature of the attack.

The alert could also be communicated to a user (e.g., an analyst, an administrator, etc.) via the user interface 170, via email, or via any other form of communication. The user can then act on the alert.

Hypothetical Scenario

The principles of operation of the cyber profiling system 100 will now be further illustrated in the context of a hypothetical scenario. In the hypothetical scenario, the database 110 contains AAD that includes a profile of a sophisticated adversary ("Adversary X"), who is known to be associated with a foreign intelligence service. The profile stored in the database 110, such as the sample profile shown in FIG. 4B, details several unique programming techniques utilized by Adversary X in previously observed cyber-attack tools that have not been observed elsewhere. In addition, database 110 contains AAD regarding the level of sophistication of Adversary X's programming skills and intent of prior attacks (including the types of assets targeted). In this hypothetical scenario, the cyber profiling system 100 preferably executes the following process:

1. New attack data is gathered by a sensor node 150 and is transmitted to the analysis engine 120.
2. The analysis engine 120 performs analysis of a binary software image sent transmitted by the sensor node 150 and extracts quantitative data (EQD) associated with the software's functionality and sophistication of authorship. The EQD is transmitted to the intelligence engine 130.
3. The intelligence engine 130 receives the EQD from the analysis engine 120, and identifies a correlation between the EQD and Adversary X. The intelligence engine determines that there is a 95% probability that Adversary X and the adversary responsible for creating the new attack data are the same. This is based on the sophistication of the software, the use of techniques only used by Adversary X in the past, and data indicating that Adversary X is known to target systems hosting source code.
4. This probability triggers an alert which is communicated to an attack analyst via the user interface 170, and which prompts the attack analyst to send a request to the analysis engine 120 that it send the original binary software image to the intelligence engine for further analysis.
5. Based on this high probability the intelligence engine automatically updates the record for Adversary X with the data collected from sensor node 150. This includes additional EQD which may assist in the future detection of attacks by Adversary X.

The attack analyst confirms an affirmative link between Adversary X and the new attack data, and is able to provide a timely notification to the owner of sensor node 150 who is potentially impacted by this threat.

Additional Configurations

Figure 6:
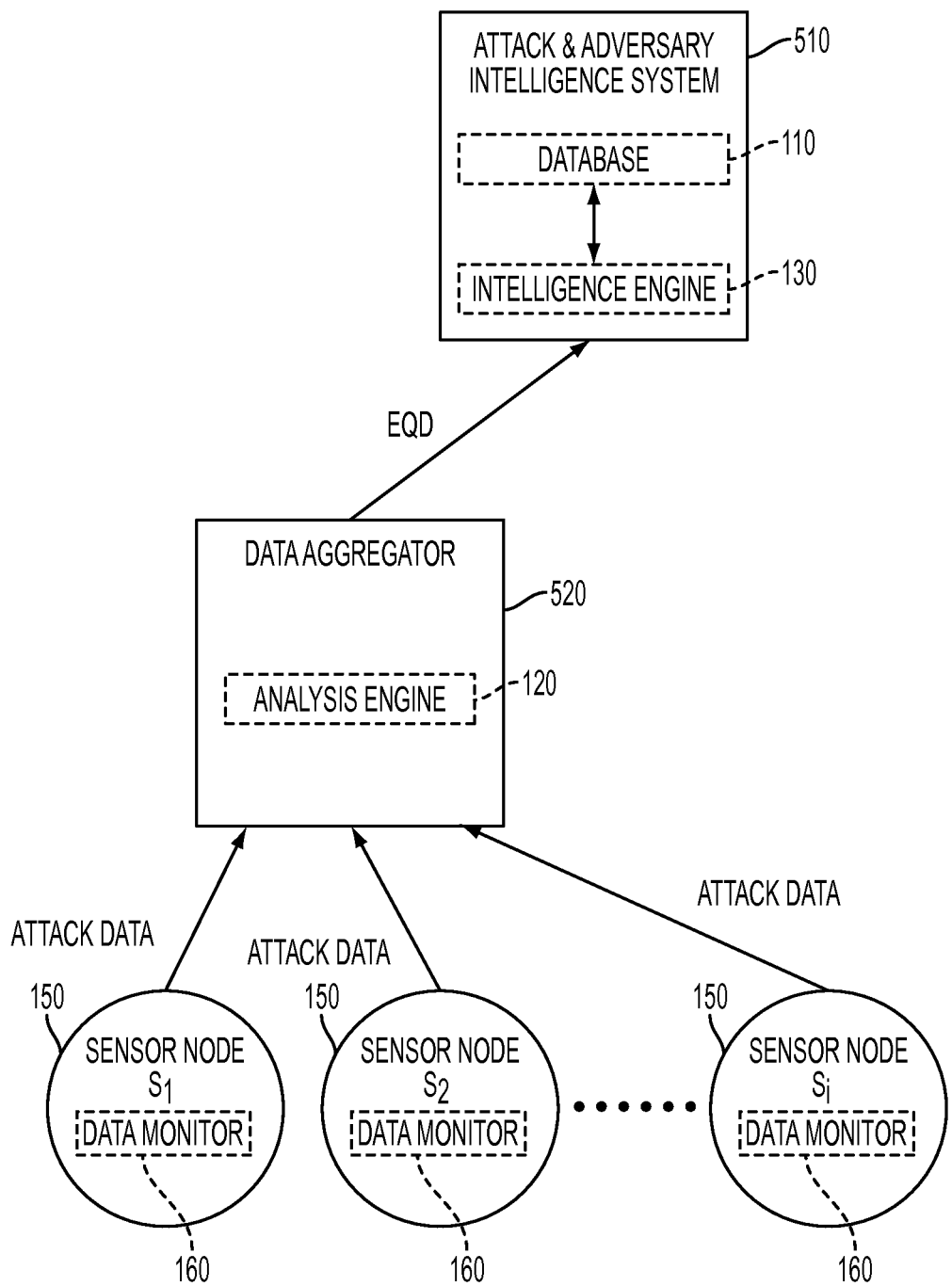
FIG. 6 is a block diagram of a cyber profiling system, in accordance with one preferred embodiment of the present invention.

FIG. 6 is a block diagram of a cyber profiling system 500, in accordance with one preferred embodiment of the present invention. In this embodiment, intelligence engine 130 and database 110 reside and run on an attack & adversary intelligence system (AAIS) 510, and the analysis engine 120 resides and runs on a data aggregator 520.

The database 110 and intelligence engine 130 are preferably each implemented with one or more programs or applications run by the AAIS 510. Similarly, the analysis engine 120 is preferably implemented with one or more programs or applications run by the data aggregator 520. As described above in connection with the system of FIG. 1, the programs or applications that implement the database 110, analysis engine 120 and intelligence engine 130 are respective sets of computer readable instructions that are stored in memory (not shown) that are accessed by the AAIS 510 (in the case of the intelligence engine 130 and database 110) and by the data aggregator 520 (in the case of the analysis engine).

The AAIS 510 and data aggregator 520 can be implemented with any type of processing device, such as a general purpose desktop computer, general purpose laptop computer, a special purpose computer, a server, a tablet computer, a smartphone, a programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of running the software used to implement the analysis engine 120 can be used as the data aggregator 520, and any device on which a finite state machine capable of running the software used to implement the intelligence engine 130 and the database 110 can be used as the AAIS 510.

The AAIS 510, data aggregator 520 and sensor nodes 150 are preferably connected to one or more networks (hereinafter referred to as "network") through which they can communicate with each other. The network can be a wired or wireless network, and may include or interface to any one or more of for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, an ATM (Asynchronous Transfer Mode) connection, an FDDI (Fiber Distributed Data Interface) or CDDI (Copper Distributed Data Interface) connection.

The network may furthermore be, include or interface to any one or more of a WAP (Wireless Application Protocol) link, a GPRS (General Packet Radio Service) link, a GSM (Global System for Mobile Communication) link, CDMA (Code Division Multiple Access) or TDMA (Time Division Multiple Access) link, such as a cellular phone channel, a GPS (Global Positioning System) link, CDPD (Cellular Digital Packet Data), a RIM (Research in Motion, Limited) duplex paging type device, a Bluetooth radio link, an IEEE standards-based radio frequency link (WiFi), or any other type of radio frequency link. The network may yet further be, include or interface to any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection.

The system 500 operates in a manner similar to the system 100 of FIG. 1, except that the data aggregator that contains the analysis engine 120 is remotely located from the AAIS that contains the intelligence engine 130 and the database 110. This model is preferred for a high degree of scalability and efficiency in large complex environments. The data aggregator 520 collects attack data from sensor nodes 150 for analysis by the analysis engine 120. The functions and operation of the analysis engine 120, intelligence engine 130 and database 110 are the same as that described above in connection with system 100.

With this embodiment, one or more data aggregators 520 can be geographically dispersed, with each data aggregator 520 assigned a group of sensor nodes 150 from which to receive attack data. A benefit of performing the analysis of the attack data at the data aggregator 520 instead of at up-stream assets, such as the AAIS 510, is one of efficiency. Raw attack data sent from sensor nodes 150 is often high in volume and large in data size. By obtaining the EQD at the data aggregators 520, one can avoid transmitting unnecessary volumes of often unwanted data to up-stream peers such as the AAIS 510. Instead, one can transmit the EQD which is what is used to determine the adversary and/or attack profile.

As discussed above in connection with system 100, the analysis engine 120 in the data aggregator 520 can be easily reprogrammed by a user, such that the way in which attack data is processed, analyzed and derived into EQD can be modified. This reprogramming can be done, for example, via a user interface (not shown) or via communications between the AAIS 510 and the data aggregator 520 over the network. This may include the introduction of new analysis engine 120 behaviors and/or the modification of existing analysis engine 120 behaviors. Data aggregators 520 may additionally respond to requests from the AAIS 510 to transmit the raw, unprocessed attack data received from sensor nodes 150.

The AAIS 510 may be assigned to one or multiple data aggregators 520. In a services-based scenario, the AAIS 520 is preferably responsible for gathering data from multiple data aggregators 520, with each data aggregator 520 monitoring a predetermined number of sensor nodes 150. Further, each AAIS 510 is preferably adapted to synchronize its data with other AAIS's 510.

Figure 7:
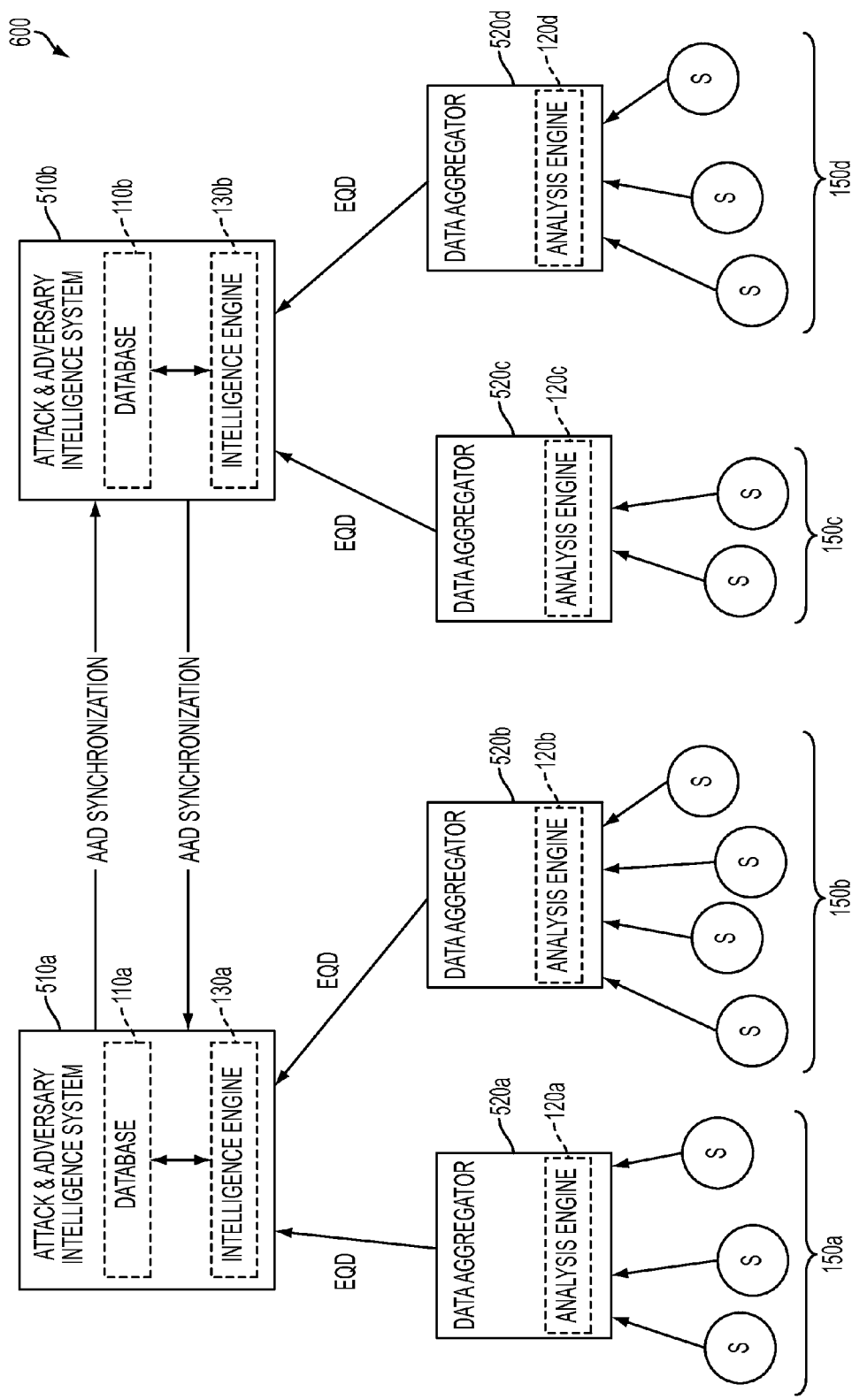
FIG. 7 is a block diagram illustrating a cyber profiling network, in accordance with one preferred embodiment of the present invention.

FIG. 7 is a block diagram illustrating a cyber-attack identification and profiling network 600, in accordance with one preferred embodiment of the present invention. For illustrative purposes, the cyber-attack identification and profiling network 600 contains two AAIS's 510a and 510b, four data aggregators 520a-520d and four groups of sensor nodes 150a-150d that collectively contain 12 sensor nodes (labeled "S"). However, it should be appreciated that any number of AAIS's, data aggregators and sensor nodes may be used while still falling within the scope of the present invention. Further to this, multiple data aggregators and AAIS's may be present for the purpose of high availability, redundancy and/or disaster recovery.

In the FIG. 7 example, data aggregators 520a and 520b are assigned to AAIS 510a, and thus they each send EQD to AAIS 510a. Data aggregator 520a receives attack data from the sensor nodes in sensor node group 150a, while data aggregator 520b receives attack data from sensor nodes in sensor node group 150b.

Similarly, data aggregators 520c and 520d are assigned to AAIS 510b, and thus they each send EQD to AAIS 510b. Data aggregator 520c receives attack data from the sensor nodes in sensor node group 150c, while data aggregator 520d receives attack data from sensor nodes in sensor node group 150d.

Each data aggregator and their associated sensor node group could be connected to its own unique network or all data aggregators/sensor node groups could share a common network. The two AAIS's 510a and 510b communicate over a network and the AAD in each AAIS are preferably synchronized with each other, so that AAD is shared among all the AAIS's in the cyber profiling network 600. In addition, the respective SED database associated with each analysis engine 120a-120d may optionally be synchronized with each other under the instruction of the AAIS's 510a and 510b. Synchronization may occur via a broad set of communications paths including, but not limited to, Internet orientated cloud-based services, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34bis analog modem connection, a cable modem, an ATM (Asynchronous Transfer Mode) connection, an FDDI (Fiber Distributed Data Interface) or CDDI (Copper Distributed Data Interface) connection.

The foregoing embodiments and advantages are merely exemplary, and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Various changes may be made without departing from the spirit and scope of the invention, as defined in the following claims.

What is claimed is:

1. A method of analyzing a cyber-attack, comprising:
collecting attack data from sensor nodes, wherein each sensor node comprises a first processor, and wherein the attack data comprises data associated with a cyber-attack;
transmitting the attack data from the first processor to at least a second processor;
extracting quantitative data from the attack data using the at least second processor, wherein the extracted quantitative data ("EQD") comprises data related to a plurality of metrics associated with a cyber-attack that is used to profile a behavior of a human entity or entities ("Adversary");
comparing the EQD with a database of existing adversary and attack data ("AAD") using the at least second processor, wherein the AAD comprises data associated with metrics of known adversaries and known adversary behavior; and
determining, using the at least second processor, if the EQD is associated with a known adversary and/or known adversary behavior based on the comparison step;
wherein the metrics associated with the cyber-attack and the metrics of known adversaries and known adversary behavior are associated with at least one predetermined category, wherein the at least one predetermined category comprises at least an adversary sophistication level determined by analysis of codes in the attack data ("attack codes") to determine the sophistication level of the attack codes.

2. The method of claim 1, wherein it is determined whether the EQD is associated with a known adversary and/or known adversary behavior by:
determining correlation levels between the EQD and the profiles of known adversaries;
determining probability values that the EQD is associated with known adversaries and/or known adversary behavior based on the correlation levels; and
determining whether the EQD is associated with a known adversary and/or known adversary behavior based on the probability values.

3. The method of claim 1, wherein the at least one predetermined category further comprises the objectives of the cyber-attack.

4. The method of claim 1, wherein it is determined whether the EQD is associated with a known adversary by:
determining if one or more probability values exceed a predetermined threshold;
determining that the EQD is associated with an unknown adversary if no probability values exceed the predetermined threshold; and
linking the EQD with a known adversary associated with the highest probability value that exceeds the predetermined threshold.

5. The method of claim 1, wherein the adversary sophistication level is determined by identifying and analyzing at least one of the following programmatic artifacts in the attack codes:
(1) nested conditional statements;
(2) unclosed file handles;
(3) duplicate or unutilized code segments or functionality;
(4) memory leaks;
(5) unclosed or duplicate network sockets;
(6) memory corruption issues resulting from the allocation and/or de-allocation of memory;
(7) unutilized variables;
(8) variable initialization and type setting issues;
(9) integer variable signing and sizing issues;
(10) variable scoping and visibility issues;
(11) variable termination issues; and
(12) shared memory permissions flaws;
(13) programmatic loop control/management flaws.

6. A system for analyzing a cyber-attack, comprising:
a processor;
processor memory; and
a cyber profiling engine comprising a set of computer readable instructions stored in processor memory that are executable by the processor to:
receive attack data, wherein the attack data comprises data associated with a cyber-attack,
extract quantitative data from the attack data, wherein the extracted quantitative data ("EQD") comprises data related to a plurality of metrics associated with a cyber-attack that is used to profile a behavior of a human entity or entities ("Adversary"),
compare the EQD with a database of existing adversary and attack data ("AAD"), wherein the AAD comprises data associated with metrics of known adversaries and known adversary behavior, and
determine if the EQD is associated with a known adversary and/or known adversary behavior based on the comparison step;
wherein the metrics associated with the cyber-attack and the metrics of known adversaries and known adversary behavior are associated with at least one predetermined category, wherein the at least one predetermined category includes at least an adversary sophistication level determined by analysis of codes in the attack data ("attack codes") to determine the sophistication level of the attack codes.

7. The system of claim 6, the processor determines whether the EQD is associated with a known adversary and/or known adversary behavior by:
determining correlation levels between the EQD and the profiles of known adversaries;
determining probability values that the EQD is associated with known adversaries and/or known adversary behavior based on the correlation levels; and
determining whether the EQD is associated with a known adversary and/or known adversary behavior based on the probability values.

8. The system of claim 6, further comprising:
at least one sensor node, wherein each sensor node comprises a sensor node processor and sensor node memory; and
a respective data monitor associated with each sensor node, wherein each data monitor comprises a set of computer readable instructions stored in sensor node memory that are executable by the sensor node processor to:
collect the attack data, and
transmit the attack data to the cyber profiling engine.

9. The system of claim 6, wherein the processor comprises a first processor and a second processor, and wherein the processor memory comprises first processor memory associated with the first processor and second processor memory associated with the second processor.

10. The system of claim 9, wherein the cyber profiling engine comprises:
an analysis engine comprising a set of computer readable instructions stored in first processor memory that are executable by the first processor to:
receive the attack data, and
extract the quantitative data from the attack data; and
an intelligence engine comprising a set of computer readable instructions stored in second processor memory that are executable by the second processor to:
receive the EQD,
compare the EQD with the database of AAD, and
determine if the EQD is associated with a known adversary and/or known adversary behavior based on the comparison step.

11. The system of claim 6, wherein the adversary sophistication level is determined by identifying and analyzing at least one of the following programmatic artifacts in the attack codes:
(1) nested conditional statements;
(2) unclosed file handles;
(3) duplicate or unutilized code segments or functionality;
(4) memory leaks;
(5) unclosed or duplicate network sockets;
(6) memory corruption issues resulting from the allocation and/or de-allocation of memory;
(7) unutilized variables;
(8) variable initialization and type setting issues;
(9) integer variable signing and sizing issues;
(10) variable scoping and visibility issues;
(11) variable termination issues; and
(12) shared memory permissions flaws;
(13) programmatic loop control/management flaws.

12. A system for analyzing a cyber-attack, comprising:
at least one attack and adversary intelligence system ("AAIS"), wherein each AAIS comprises an AAIS processor and AAIS memory;
at least one data aggregator associated with each AAIS, wherein each data aggregator comprises a data aggregator processor and data aggregator memory;
a respective analysis engine associated with each data aggregator comprising a set of computer readable instructions stored in data aggregator memory that are executable by the data aggregator processor to:
receive attack data, wherein the attack data comprises data associated with a cyber-attack,
extract quantitative data from the attack data, wherein the extracted quantitative ("EQD") comprises data related to a plurality of metrics associated with a cyber-attack that is used to profile a behavior of a human entity or entities ("Adversary");
a respective database associated with each AAIS comprising a set of computer readable instructions stored in AAIS memory that are executable by the AAIS processor to store existing adversary and attack data ("AAD"), wherein the AAD comprises data associated with metrics of known adversaries and known adversarial behavior; and
a respective intelligence engine associated with each AAIS comprising a set of computer readable instructions stored in AAIS memory that are executable by the AAIS processor to:
receive the EQD,
compare the EQD with the AAD, and
determine if the EQD is associated with a known adversary and/or known adversary behavior based on the comparison step;
wherein the metrics associated with the cyber-attack and the metrics of known adversaries and known adversary behavior are associated with at least one predetermined category, wherein the at least one predetermined category includes at least an adversary sophistication level determined by analysis of codes in the attack data ("attack codes") to determine the sophistication level of the attack codes.

13. The system of claim 12, further comprising:
at least one sensor node associated with each data aggregator, wherein each sensor node comprises a sensor node processor and sensor node memory; and
a respective data monitor associated with each sensor node, wherein each data monitor comprises a set of computer readable instructions stored in sensor node memory that are executable by the sensor node processor to:
collect the attack data, and
transmit the attack data to its respective data aggregator.

14. The system of claim 13, wherein the at least one AAIS comprises a plurality of AAIS's, and wherein at least two data aggregators are associated with each AAIS.

15. The system of claim 14, wherein the plurality of AAIS's maintain their respective databases in synchronization over a network.

16. The system of claim 14, wherein a plurality of sensor nodes are associated with each data aggregator.

17. The system of claim 12, wherein the at least one AAIS and the at least one data aggregator communicate over at least one network.

18. The system of claim 12, wherein the adversary sophistication level is determined by identifying and analyzing at least one of the following programmatic artifacts in the attack codes:
(1) nested conditional statements;
(2) unclosed file handles;
(3) duplicate or unutilized code segments or functionality;
(4) memory leaks;
(5) unclosed or duplicate network sockets;
(6) memory corruption issues resulting from the allocation and/or de-allocation of memory;
(7) unutilized variables;
(8) variable initialization and type setting issues;
(9) integer variable signing and sizing issues;
(10) variable scoping and visibility issues;
(11) variable termination issues; and
(12) shared memory permissions flaws;
(13) programmatic loop control/management flaws.

* * * * *